(12) United States Patent
Walsh et al.

(10) Patent No.: US 7,516,236 B2
(45) Date of Patent: Apr. 7, 2009

(54) METHOD TO IMPROVE PERCEIVED ACCESS SPEED TO DATA NETWORK CONTENT USING A MULTICAST CHANNEL AND LOCAL CACHE

(75) Inventors: Rod Walsh, Tampere (FI); Mika Grundström, Tampere (FI); Harri Hakulinen, Tampere (FI)

(73) Assignee: Nokia Corporation, Espoo (FI)

( * ) Notice: Subject to any disclaimer, the term of this patent is extended or adjusted under 35 U.S.C. 154(b) by 701 days.

(21) Appl. No.: 10/032,116

(22) Filed: Dec. 21, 2001

(65) Prior Publication Data

US 2006/0031557 A1    Feb. 9, 2006

(51) Int. Cl.
*G06F 15/16* (2006.01)

(52) U.S. Cl. ...................... 709/232; 370/389

(58) Field of Classification Search ............... 709/217, 709/232, 223–226, 230, 240, 249, 219, 227, 709/245; 370/401, 390, 316, 270, 255, 352; 718/105; 705/1, 27, 42; 463/42; 725/14
See application file for complete search history.

(56) References Cited

U.S. PATENT DOCUMENTS

| | | | | |
|---|---|---|---|---|
| 5,515,513 A * | 5/1996 | Metzger et al. | ............. | 709/249 |
| 5,530,703 A * | 6/1996 | Liu et al. | ............. | 370/255 |
| 5,848,396 A * | 12/1998 | Gerace | ............. | 705/10 |
| 5,889,950 A | 3/1999 | Kuzma | | |
| 5,920,705 A * | 7/1999 | Lyon et al. | ............. | 709/240 |
| 5,946,326 A | 8/1999 | Rinne | ............. | 725/54 |
| 6,038,601 A * | 3/2000 | Lambert et al. | ............. | 709/226 |
| 6,064,676 A | 5/2000 | Slattery | ............. | 370/412 |
| 6,078,957 A * | 6/2000 | Adelman et al. | ............. | 709/224 |
| 6,085,243 A * | 7/2000 | Fletcher et al. | ............. | 709/224 |
| 6,111,896 A | 8/2000 | Slattery | ............. | 370/535 |
| 6,115,393 A * | 9/2000 | Engel et al. | ............. | 370/469 |
| 6,148,082 A | 11/2000 | Slattery | ............. | 380/212 |
| 6,181,697 B1 * | 1/2001 | Nurenberg et al. | ............. | 370/390 |
| 6,195,368 B1 | 2/2001 | Gratacap | ............. | 370/535 |
| 6,195,680 B1 * | 2/2001 | Goldszmidt et al. | ............. | 709/203 |
| 6,246,701 B1 | 6/2001 | Slattery | ............. | 370/503 |
| 6,259,701 B1 * | 7/2001 | Shur et al. | ............. | 370/401 |
| 6,272,127 B1 * | 8/2001 | Golden et al. | ............. | 370/352 |
| 6,292,490 B1 | 9/2001 | Gratacap | ............. | 370/412 |
| 6,351,467 B1 | 2/2002 | Dillon | | |
| 6,385,647 B1 * | 5/2002 | Willis et al. | ............. | 709/217 |

(Continued)

FOREIGN PATENT DOCUMENTS

EP    0 890 907 A    1/1999

(Continued)

OTHER PUBLICATIONS

Multicast Routing: www-net.cs.umass.edu/kurose/network/mcast/mcast.htm.*

(Continued)

*Primary Examiner*—Thong H Vu
(74) *Attorney, Agent, or Firm*—Locke Lord Bissell & Liddell LLP

(57) ABSTRACT

A method for increasing a user's perceived access speed to content available from a data network. The method utilizes a multicast channel and the selection of group data to be sent over that channel.

34 Claims, 3 Drawing Sheets

U.S. PATENT DOCUMENTS

| | | | | |
|---|---|---|---|---|
| 6,424,657 | B1* | 7/2002 | Voit et al. | 370/412 |
| 6,463,447 | B2* | 10/2002 | Marks et al. | 715/513 |
| 6,473,794 | B1* | 10/2002 | Guheen et al. | 709/223 |
| 6,523,120 | B1 | 2/2003 | Strasnick | |
| 6,535,855 | B1* | 3/2003 | Cahill et al. | 705/1 |
| 6,584,082 | B1* | 6/2003 | Willis et al. | 370/316 |
| 6,602,191 | B2* | 8/2003 | Quy | 600/300 |
| 6,604,147 | B1* | 8/2003 | Woo | 709/240 |
| 6,628,625 | B1* | 9/2003 | Birdwell et al. | 370/270 |
| 6,658,463 | B1* | 12/2003 | Dillon et al. | 709/219 |
| 6,691,165 | B1* | 2/2004 | Bruck et al. | 709/227 |
| 6,694,412 | B2* | 2/2004 | Frank et al. | 711/153 |
| 6,714,987 | B1* | 3/2004 | Amin et al. | 709/249 |
| 6,728,748 | B1* | 4/2004 | Mangipudi et al. | 718/105 |
| 6,771,644 | B1* | 8/2004 | Brassil et al. | 370/390 |
| 6,886,013 | B1 | 4/2005 | Beranek | |
| 6,895,084 | B1* | 5/2005 | Saylor et al. | 379/88.22 |
| 6,904,408 | B1* | 6/2005 | McCarthy et al. | 705/2 |
| 6,968,394 | B1* | 11/2005 | El-Rafie | 709/245 |
| 6,987,964 | B2* | 1/2006 | Obradovich et al. | 455/414.1 |
| 7,013,290 | B2* | 3/2006 | Ananian | 705/27 |
| 7,065,579 | B2* | 6/2006 | Traversat et al. | 709/230 |
| 7,242,752 | B2* | 7/2007 | Chiu | 379/88.04 |
| 2002/0026419 | A1* | 2/2002 | Maritzen et al. | 705/41 |
| 2002/0053078 | A1* | 5/2002 | Holtz et al. | 725/14 |
| 2002/0073167 | A1* | 6/2002 | Powell et al. | 709/217 |
| 2002/0073338 | A1* | 6/2002 | Burrows et al. | 713/201 |
| 2002/0112073 | A1* | 8/2002 | MeLampy et al. | 709/240 |
| 2002/0133539 | A1* | 9/2002 | Monday | 709/203 |
| 2002/0147047 | A1* | 10/2002 | Letovsky et al. | 463/42 |
| 2002/0152305 | A1* | 10/2002 | Jackson et al. | 709/224 |
| 2002/0152319 | A1* | 10/2002 | Amin et al. | 709/232 |
| 2002/0180781 | A1* | 12/2002 | Cezeaux et al. | 345/738 |
| 2002/0184376 | A1* | 12/2002 | Sternagle | 709/230 |
| 2003/0154279 | A1* | 8/2003 | Aziz | 709/225 |
| 2004/0138951 | A1* | 7/2004 | Silverbrook et al. | 705/14 |
| 2004/0162901 | A1* | 8/2004 | Mangipudi et al. | 709/225 |
| 2005/0002388 | A1* | 1/2005 | Gao | 370/389 |
| 2005/0289054 | A1* | 12/2005 | Silverbrook et al. | 705/40 |

FOREIGN PATENT DOCUMENTS

| | | |
|---|---|---|
| EP | 1 233 576 A | 8/2002 |
| KR | 1999-29312 | 4/1999 |
| KR | 2001-22687 | 3/2001 |
| WO | WO 95/34153 A | 12/1995 |
| WO | WO 97/45786 A | 12/1997 |
| WO | WO 99/08429 A | 2/1999 |
| WO | WO9908429 | 2/1999 |
| WO | WO0036497 A1 | 6/2000 |

OTHER PUBLICATIONS 6A-4 A Multicast Routing Protocol for Ad-Hoc Networks www.ieee-infocom.org/1999/papers/06a_04.pdf.*

Intra- and Inter-Domain Multicast Routing Protocols: A Survey and Taxonomy www.comsoc.org/livepubs/surveys/public/1q00issue/ramalho.html.*

Silberschatz and Galvin Chapter 17; spiranthes.tamu.edu/~furuta/courses/99a_410/slides/chap17.pdf.*

Internet Protocol IP Multicast Technology www.gheek.net/docs/cisco/multicast/whitepapers/technology_overview.*

All About ISOC: Conferences—www.isoc.org/inet98/proceedings/1j/1j_2.htm.*

Testing Java monitors through deterministic execution; Harvey, C.; Strooper, P.; Software Engineering Conference, 2001. Proceedings. 2001 Australian Aug. 27-28, 2001 pp. 61-67.*

The interaction between a development group in a technology intensive firm and a customer organization Bailetti, A.J.; Duran, J.M.; Technology Management : the New International Language, 1991 Oct. 27-31, 1991 pp. 37-40.*

SINA: Super-highway Information Networking ArchitectureSung Won Park; Geon Ung Kim; Sun Shin An; Man Sang Chung; Eun Ho Choi;Universal Personal Communications, 1994. Record., 1994 Third Annual International Conference onSep. 27-Oct. 1, 1994 pp. 276-280.*

T. Herfert et al., "Internet-TV—Konvergenz Von Diensten Und Geraeten ?", vol. 52, No. 1/2, Jan. 1998, pp. 58-62 and 64.

J. S. Baras et al., "Fast Asymmetric Internet Over Wireless Satellite-Terrestrial Networks", Milcom 97 Proceedings, vol. 1, Nov. 3, 1997, pp. 372-377.

H.D. Clausen et al., "Internet Over Direct Broadcast Satellites", IEEE Communications Magazine, Jun. 1999, pp. 146-151.

V. Arora et al., "Hybrid Internet Access", American Institute of Physics, 1995, pp. 69-74.

European Supplementary Search Report and Annex thereto for EP 02788394, Date of Completion of Search—Jun. 30, 2005.

* cited by examiner

METHOD TO IMPROVE PERCEIVED ACCESS SPEED TO DATA NETWORK CONTENT USING A MULTICAST CHANNEL AND LOCAL CACHE

FIELD OF THE INVENTION

This invention relates to systems and methods for sending shared data over a shared access medium.

BACKGROUND OF THE INVENTION

Today, many users access content from data networks by using unicast or point-to-point connections. Accessing a data network in this fashion can be slow as a result of delays imposed by the network. Moreover, accessing a data network using point to point connections over a wireless network can be even slower due to delays imposed by both the fixed network and the wireless network.

In addition, point-to-point connections over a broadcast network, such as DVB-T (digital video broadcasting-terrestrial), means that the bandwidth must be split between the clients. This is an inefficient use of bandwidth which presents a problem because the DVB-T broadcast network has a limited and shared capacity.

SUMMARY OF THE INVENTION

A technical advance is achieved in the art by providing a method to increase a user's perceived access speed to content available from a data network (e.g., internet, extranet, intranet, LAN (local area network), etc.)

An exemplary method for increasing perceived access speed to content available from a data network comprises selecting data to be sent to multicast groups based on a predetermined policy and sending the data over the multicast channel. The policy may be, for example, based on client requests or based on information from an agent that monitors web hits from the system clients.

An exemplary method for increasing perceived access speed to content available from a data network comprises selecting the data to be sent over a shared multicast channel, sending the shared data over the multicast channel, receiving the shared data by a reception agent, filtering the shared data by the reception agent, storing the filtered data in a local cache, and retrieving the cached data for user consumption.

In an alternate embodiment, the method involves measuring user demand for data, selecting the data to be sent over a shared multicast channel, sending the shared data over the multicast channel, receiving the shared data by a reception agent, filtering the shared data by the reception agent, storing the filtered data in a local cache, and retrieving the cached data for user consumption.

In accordance with another embodiment of the invention, the method involves measuring user demand for data using a web proxy, selecting the data to be sent over a shared multicast channel, sending the shared data over the multicast channel, receiving the shared data by a reception agent, filtering the shared data by the reception agent, storing the filtered data in a local cache, and retrieving the cached data for user consumption.

In accordance with another embodiment of the invention, the method involves measuring user demand for data, selecting the data to be sent over a shared multicast channel, sending the shared data over the multicast channel, receiving the shared data by a reception agent, filtering the shared data by the reception agent, storing the filtered data in a local cache, implementing the client with a local web proxy, which will also store data in the local cache, and retrieving the cached data for user consumption.

In accordance with yet another embodiment of the invention, the apparatus involves a memory having program code stored therein and a processor connected to said memory for carrying out instructions in accordance with stored program code. Stored program code, when executed by said processor, causes said processor to perform the following steps. Said processor receives a user input request for data from a data network, determines whether said requested data is to be retrieved from the local cache or the data network, and retrieves said requested data for user consumption.

Other and further aspects of the present invention will become apparent during the course of the following description and by referring to the attached drawings.

BRIEF DESCRIPTION OF THE DRAWINGS

The disclosed inventions will be described with reference to the accompanying drawings, which show exemplary embodiments of the invention and which are incorporated in the specification hereof by reference, wherein.

DETAILED DESCRIPTION

Figure 1:
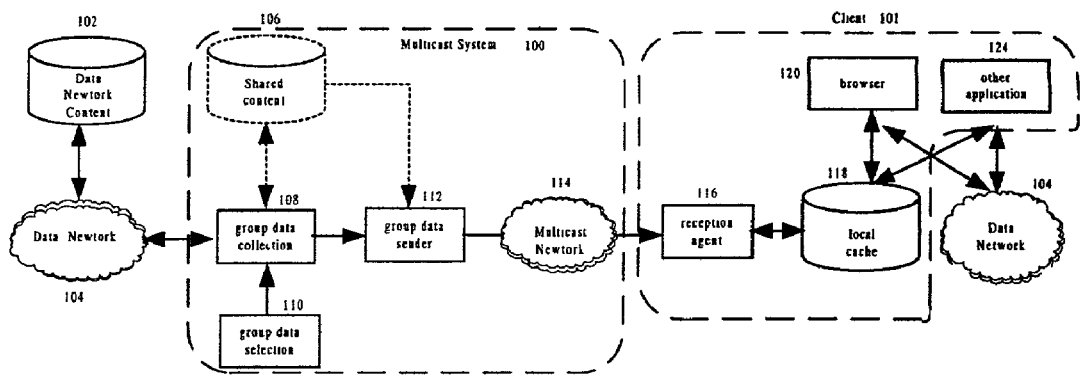
FIG. 1 depicts an embodiment of the invention where the group data selection is configured by the multicast network administrator.

FIG. 1 depicts a system in accordance with one embodiment of the invention with group data selection 110 configured by a multicast network administrator. Group data is data that is selected to be sent over the multicast network 114. The multicast network 114 may employ protocols including DVB-T to transmit the data. As shown in FIG. 1, the multicast system 100 comprises software modules for selecting 110, collecting 108, and sending 112 group data from a data network 104, a database 106 for storing shared content and a multicast network 114. A client terminal 101 for consuming group data may comprise a PC, mobile phone or the like, includes a browser and/or other applications for browsing and consuming content. It also includes a local cache 118 for storing content. In accordance with the present invention, the client terminal 101 also includes a reception agent 116 for receiving and filtering the content. In the embodiment depicted in FIG. 1, an exemplary method for increasing a user's perceived access speed to content available from a data network 104 includes selecting data 110 to be sent over a shared multicast channel 114, collecting the data to be sent 108, optionally sending the collected data to a shared cache 106, sending the data 112 over a multicast network 114, receiving the data by a reception agent 116, filtering the data by the reception agent 116, storing the filtered data in a local cache 118, and retrieving the filtered data from the cache for user consumption.

The data network 104 shown in FIG. 1 may be, for example, the internet, an intranet, an extranet, or a LAN. The group data is selected 110 based on a configuration from the multicast network administrator. In one embodiment, the group data may be manually selected and entered into the Multicast system. Once the data is selected, the system would automatically perform the collecting, sending, etc. In another embodiment, the data may be automatically selected using an agent (software) using general policies. For example, the policy (in human readable format) may be:

send the top 100 web file downloads, the top 100 web sites to a maximum link depth of 20, and the top 101-500 web sites to a maximum link depth of 3. Send only files that are under 1 MB in size. Top 1000 chart lists are available from http://www.statistics.com/webtop1000.isam. Update your information every 2 hours.

Then, the method of selecting would be performed autonomously by the agent.

Once data has been selected, the group data selection module 110 could request that the group data collection module 108 go collect the data. After the data is collected 108, it may be sent directly to the multicast group data sender module 112 or it may be collected in advance of sending over the multicast network 114 by sending the data to the shared cache 106. Once the data is sent over the multicast network 114, the data is received by a reception agent module 116. The reception agent 116 filters the incoming data so that only desirable content for a particular user is stored, and then only up to a certain amount of storage space. The reception agent 116 deals with receiving all data, filtering out the unwanted data, and sending the remainder to the local cache 118. The filtering mechanism may be implemented in a number of ways. In one embodiment, the filtering mechanism can be implemented by using a method of pre-selection specified by the user. For example, content would be advertised ahead of time and a user would select the items they wished to receive. In another embodiment, the filtering mechanism can be implemented with a user configured profile. For example, the user would tell the agent which kind of content he likes (e.g. all web sites with military aircraft and all flight simulator games) and the user would change the profile as he wished. The agent would then automatically filter that kind of content. In another embodiment, the filtering mechanism may be implemented by using a learned user profile. A client agent may actively monitor a user's behavior and construct a profile from that behavior. For example, frequent downloads of 'claudia*.gif' may also prompt reception of 'claudia*.jpg'.

The client stores the filtered data in a local cache 118. The local cache 118 may be implemented in a number of ways. In one embodiment, the local cache 118 may be implemented as just a directory structure with web pages and files copied in. In another embodiment, the local cache 118 may be a standards based cache system such as the uHTTP (unidirectional HTTP) cache used by ATVEF (Advanced Television Enhancement Forum). In yet another embodiment, the local cache 118 may use an existing cache system, such as that used by MS Explorer. This allows easy interoperability with the existing application.

The filtered data is then retrieved from the local cache 118 for user consumption. The data may be retrieved for use by a client's browser 120 or another client application 124. If the browser application 120 does not find the data in the local cache 118, it could retrieve it directly from the data network 104.

Figure 2:
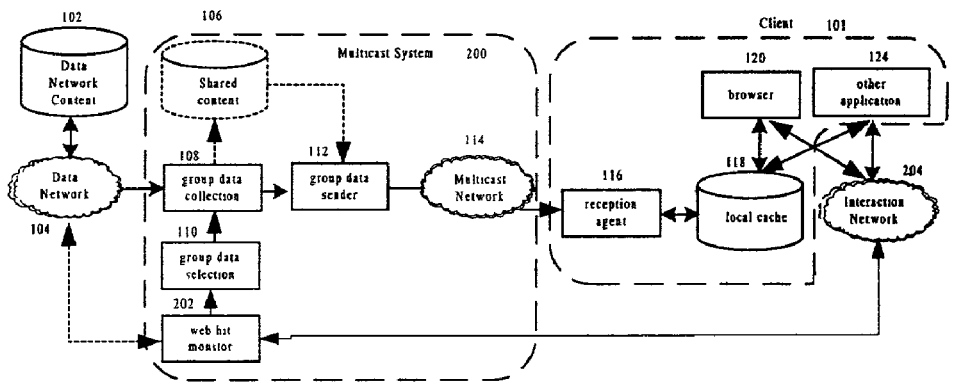
FIG. 2 depicts an embodiment of the invention where group data is selected according to web hits from users and data network content is retrieved independently of individual user transactions.

FIG. 2 depicts a system similar to FIG. 1. In FIG. 2 the group data is selected 110 according to web hits from users and data network content 102 is retrieved independently of individual user transactions. The multicast system 200 in FIG. 2 differs from that of FIG. 1 in that there is a web hit monitor 202 and an interaction network 204. The interaction network 204 may be a private telephone network, VPN (Virtual Private Network), etc. It may be any bi-directional network. It may be IP (Internet Protocol) over PSTN (Public Switched Telephone Network) or IP over GPRS (General Packet Radio Service) or IP over UMTS (Universal Mobile Telecommunications System) or IP over WLAN (wireless LAN). However, many other options are possible. In this embodiment, the method for increasing a user's perceived access speed to content available from a data network 104 includes measuring user demand for data using a web hit monitor 202, selecting 110 data to be sent over a shared multicast channel 114 based upon said user demand, collecting the data to be sent 108, optionally sending the collected data to a shared cache 106; sending the data 112 over a multicast network 114, receiving the data by a reception agent 116, filtering the data by the reception agent 116, storing the filtered data in a local cache 118, and retrieving the filtered data from the cache 118 for user consumption.

In the embodiment of FIG. 2, user demand is measured by using a web hit monitor 202. The monitoring can be performed in a number of ways. In one embodiment, the web hit monitor may include a proxy. The data passes through the proxy and the requests for content are made by the proxy on behalf of the client. A visible proxy may be accessed by configuring the client software (e.g. setting up the proxy on a browser or client-local proxy). In this way, the client ensures that all its requests (e.g. in IP packets) are routed via that proxy. A transparent proxy is not known by a client so another mechanism, such as IP tunneling or PPP (Point-to-Point Protocol) over a dial-up connection, must be used to ensure that client requests are 'routed' via this proxy. The term proxy is used generically. An implementation may use several functional proxies to perform the role of the 'logical proxy' described here (e.g., separate FTP (File Transfer Protocol) and HTTP (HyperText Transport Protocol) proxies may be used in the actual implementation.)

In another embodiment, web hits may be monitored by using a "snooper." A snooper can 'see' data on a connection as it passes, e.g. HTTP/TCP(Transmission Control Protocol)/IP packets on an Ethernet subnet. Unlike a proxy, the packets do not 'pass through' the Snooper. Like a transparent proxy, some method of routing the packets via a 'snooped subnet' is necessary, e.g. terminating the server side of an L2TP (Layer 2 Tunneling Protocol) tunnel (between the network and client) in the same domain as the Snooper.

In another embodiment, web hits may be monitored by using a Network Management Agent. Network management software and protocols provide a means to locally and remotely read data about data traffic. For example, routers may monitor all data that passes through them provide information relating to this data to a network management agent using a communication protocol such as SNMP (Simple Network Management Protocol). This network management agent may retrieve traffic reports in real-time or periodically from the router or some other network element (e.g. a VPN server or HTTP proxy) and detect client web requests from the reports.

As shown in FIG. 2, the data to be sent over the multicast channel 114 is selected by the group data selection module 110 based upon the information gathered by the web hit monitor module 202. For example, after a predetermined number of clients have requested the same web page then the page is selected to be sent over the multicast channel 114. Another example is that when a number of hits to a "sponsored page" are made, a promotional file (e.g. game) is also sent. Moreover, the thresholds may be location related, e.g. it must be two people in a certain (DVB-T) broadcast cell or on a certain IP subnet.

In another embodiment, the data may be selected by using the clients' previous web hits as a guide. For example, a hit to www.nokia.com/index.html would lead the group data selection module to predict that all the links (and images) on that page should also be sent. Another example is where the historical behavior is known (i.e., recorded) and the prediction is based on the 'normal' choice of subsequent web hits. Another example would be where a 'sponsor' policy is available and sponsored data is treated as preferable (e.g., send the linked page as well as the requested page either 'if it belongs to a sponsor and there is a 10% chance of being followed' or 'if it does not belong to a sponsor and there is a 50% chance of it being followed.') Moreover, some of these examples can be combined to create equally valid uses of the present invention.

Figure 3:
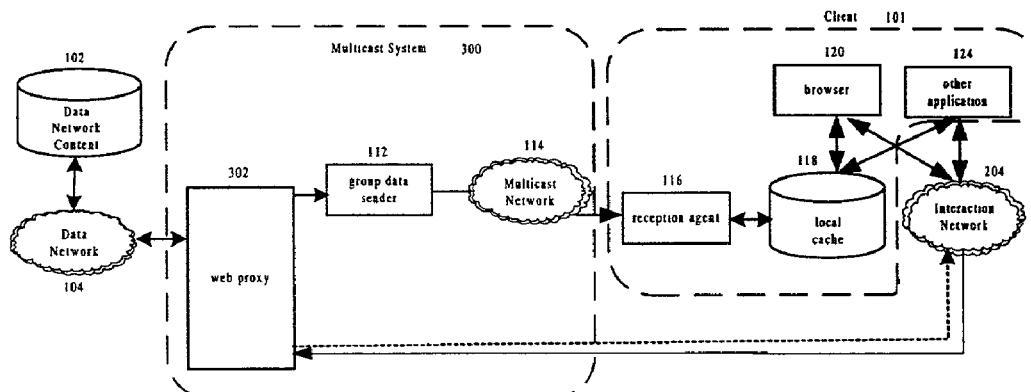
FIG. 3 depicts an embodiment of the invention where the individual user transactions are sent as group data.

FIG. 3 depicts a system similar to FIG. 2. In FIG. 3 the individual user transactions are sent as group data. The multicast system 300 in FIG. 3 differs from that of FIG. 2 in that a web proxy 302 replaces the following three elements: the web hit monitor module 202, the group data selection module 110, and the group data collection module 108. In this embodiment, an exemplary method for increasing a user's perceived access speed to content available from a data network 104 includes selecting data to be sent over a shared multicast channel 114 by using a unicast to multicast proxy 302, sending the data 112 over a multicast network 114, receiving the data by a reception agent 116, filtering the data by the reception agent 116, storing the filtered data in a local cache 118, and retrieving the filtered data from the cache 118 for user consumption.

By employing a unicast to multicast proxy 302, the items to be included in group data may be selected directly from normal client requests for unicast delivery (e.g., HTTP/TCP request) and the items may be taken directly from the unicast delivery stream. The unicast to multicast proxy 302 can be configured in a number of ways. In one embodiment, the unicast would only be converted into multicast after a threshold number of hits. In another embodiment, all client requests for unicast may be sent by multicast. In yet another embodiment, the unicast would only be converted into multicast for selected sites identified by a URL (Uniform Resource Locator) stub or subnet address. In still another embodiment, the unicast would only be converted into multicast if a predetermined period of time has elapsed since the content was last sent (e.g., in the last 12 hours.)

Figure 4:
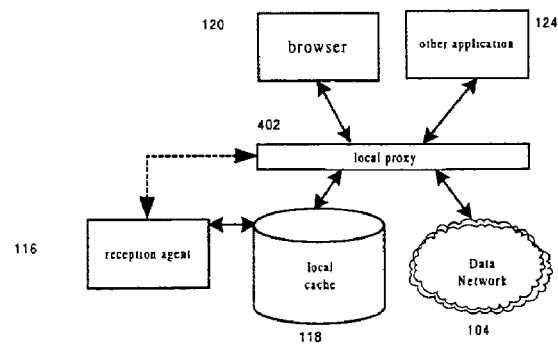
FIG. 4 depicts a slightly different client implementation using a local web proxy.

FIG. 4 depicts a client implementation of the present invention using a local proxy 402. The client implementation of FIG. 4 differs from the client implementation of FIG. 3 in that a local proxy 402 is used in FIG. 4. In this implementation, the group data sent by the multicast system is filtered by the reception agent 116, the filtered data is sent to the local cache 118, and the filtered data from the cache 118 is available for use by a browser or other application. Also, the data network 104 content is retrieved by the browser 120 or other applications 124 from a local cache 118 or the data network via a local proxy 402. The local proxy 402 may interact with the reception agent 116. In one embodiment, the local proxy 402 and the reception agent 116 may interact through an API (Application Programming Interface). A "nice" API may have the local proxy 402 ask the reception agent 116 if the client requested data is coming. In addition, an API may also ask about data that the reception agent predicts (e.g., Squid has some of this predictive functionality.) In another embodiment, the local proxy 402 and the reception agent 116 may be part of the same code and just work on internal function calls (as most WebCrawlers do.) In yet another embodiment, the local proxy 402 and the reception agent 116 may interact using any interprocess communication (e.g., Java-RMI (Remote Method Invocation), ONC (Open Network Computing)-RPC (Remote Procedure Call), SOAP (Simple Object Access Protocol), CORBA (Common Object Request Broker Architecture), DCOM (Distributed Component Object Model), TCP sockets, etc.)

The installation of a local proxy 402 on the client system would solve a number of problems. For example, the user would not need to do any special configuration because application requests for network data would pass through the proxy 402. Thus, for example, if www.demogames.com is browsed, the proxy 402 can choose whether to make an Internet request or whether to retrieve the data from the cache 118 (if available). In addition, there can be special proxy/receiver messaging and metadata which enables special features. A useful special feature would be to indicate when the cached content is out-of-date (i.e., the Internet content has changed on the Internet Server). This may be implemented as a "data will expire" time stamp or an actual announcement from the multicast system. Moreover, a proxy 402 is also a way to allow a site (e.g., either a FTP or HTTP site) to be partially or completely mirrored. Mirroring is a common technique on the internet.

Figure 5:
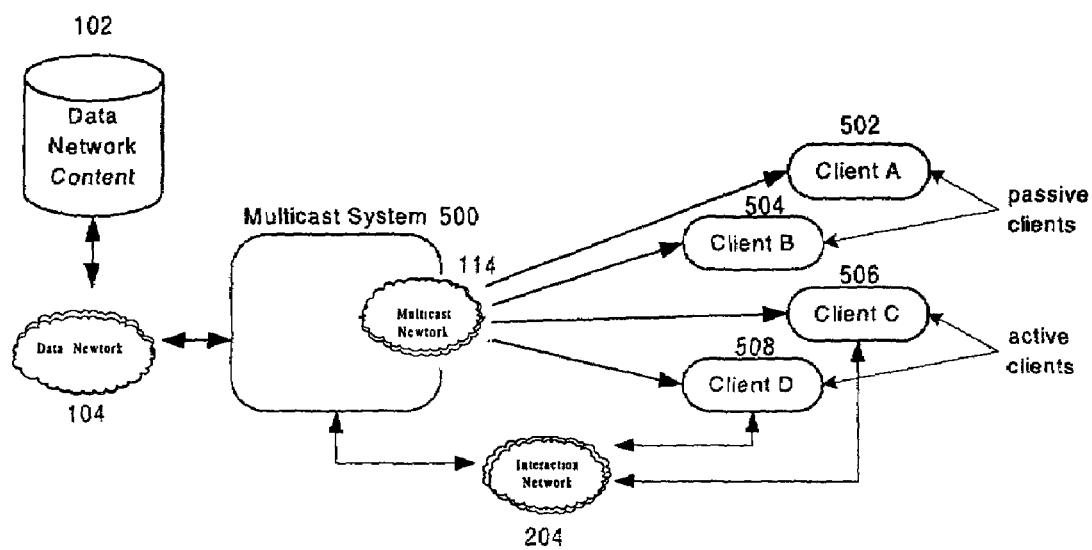
FIG. 5 depicts an embodiment of the invention where some clients are active (i.e., client uses the interaction network to send requests) and some clients are passive.

FIG. 5 depicts an embodiment of the invention where some clients are active (i.e., client uses the interaction network to send requests) and some clients are passive. According to the present invention, some or all clients may be in either an active 506, 508 or a passive 502, 504 state. A client is active 506, 508 when it uses the interaction network 204 to send requests. A client is passive 502, 504 when it is able to receive data from the Multicast Network 114 but it is not using the interaction network 204 for this service. Note that the state (active or passive) of a client may change with time.

The software, modules, components and other code and/or software elements described above could be written, for example, using an object-oriented language known in that art such as Objective-C, Java, or C#. Phrases such as "module" as used herein, may refer, for example, to program code written as a class using an object-orientated programming language and instantiated into an object using techniques known in the art of object-orientated programming.

The modules or other software could run, for example, on computers including personal computers or workstations such as Power Macintosh G4s or Dell Dimensions running operating systems such as Apple OS X, Microsoft Windows XP, or Linux, perhaps further including support for Java. The modules or other software could also run, for example, on PDAs (Personal Digital Assistant), cellular telephones, DVB-T receivers, or the like running an operating system such as Microsoft Windows CE or Symbian EPOC, perhaps with support for Java. Speaking, more generally, the modules or other software could run on a general purpose computer.

Figure 6:
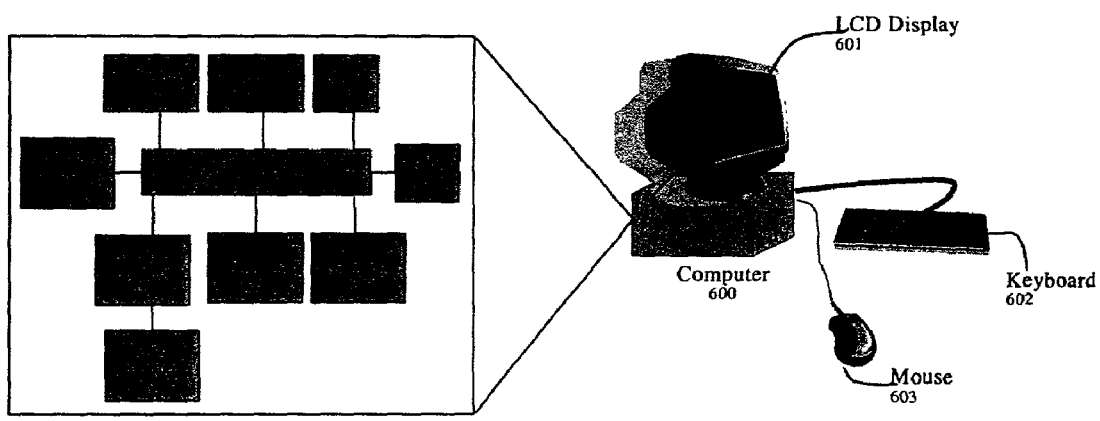
FIG. 6 depicts an exemplary general purpose computer.

The phrases "general purpose computer," "computer," and the like, as used herein, refer but are not limited to an engineering workstation, PC, Macintosh, PDA, web-enabled cellular phone and the like running an operating system such as OS X, Linux, Windows CE, Windows XP, Symbian EPOC, or the like. The phrases "general purpose computer," "computer," and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 600 as shown in FIG. 6 includes system bus 650 which operatively connects two processors 651 and 652, random access memory (RAM) 653, read-only memory (ROM) 655, input output (I/O) interfaces 657 and 658, storage interface 659, and display interface 661. Storage interface 659 in turn connects to mass storage 663. Each of I/O interfaces 657 and 658 may be an Ethernet, IEEE 1394, IEEE 802.11, or other interface such as is known in the art. Mass storage 663 may be a hard drive, optical disk, or the like. Processors 651 and 652 may each be a commonly known processor such as an IBM or Motorola PowerPC, or an Intel Pentium.

Computer 600 as shown in this example also includes an LCD display unit 601, a keyboard 602 and a mouse 603. In alternate embodiments, keyboard 602 and/or mouse 603 might be replaced with a pen interface. Computer 600 may additionally include or be attached to card readers, DVD drives, or floppy disk drives whereby media containing program code may be inserted for the purpose of loading the code onto the computer. In accordance with the present invention, computer 600 may be programmed using a language such as Java, Objective C, C, C#, or C++ according to methods known in the art to perform those operations described above.

Accordingly, the above described user terminal could be, for example, a portable device comprising a StrongARM processor, an integrated touch-sensitive color screen with the ability to receive DVB-T broadcasts and, in some embodiments, the ability to send and receive GSM, PCS, or other cellular transmissions. The device could use an operating system such as Microsoft Windows CE or Symbian EPOC, perhaps with support for Java.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A method, comprising:
   monitoring an interaction network;
   obtaining one or more measurement values corresponding to the monitoring of the interaction network;
   selecting data, wherein selection is based upon one or more of the measurement values corresponding to the monitoring of the interaction network; and
   sending the selected data over a multicast network,
   wherein the data is selected based upon number of requests for the data that originate from a broadcast cell.

2. The method of claim 1, wherein the multicast network is unidirectional.

3. The method of claim 1, wherein the interaction network is bidirectional.

4. The method of claim 1, wherein, in monitoring the interaction network, a predetermined number of requests for a page are recognized, and wherein selecting the data comprises selecting a promotional file.

5. The method of claim 1, wherein selecting the data comprises prediction based on normal subsequent data choice.

6. The method of claim 1, wherein the data is selected based upon chance of link from requested data being followed.

7. The method of claim 6, wherein a sponsor policy is employed.

8. The method of claim 1, wherein the monitoring comprises employment of a network management agent.

9. The method of claim 1, wherein the monitoring comprises employment of a proxy.

10. A method, comprising:
    providing, via an interaction network, one or more requests; and
    receiving, over a multicast network, selected data through a local proxy,
    wherein monitoring of the interaction network is performed, wherein one or more measurement values corresponding to the monitoring of the interaction network are obtained,
    wherein selection of the data is based upon one or more of the measurement values corresponding to the monitoring of the interaction network, and
    wherein the data is selected based upon number of requests for the data that originate from a broadcast cell.

11. The method of claim 10, wherein the multicast network is unidirectional.

12. The method of claim 10, wherein the interaction network is bidirectional.

13. The method of claim 10, wherein, in monitoring the interaction network, a predetermined number of requests for a page are recognized, and wherein selection of the data comprises selecting a promotional file.

14. The method of claim 10, wherein selection of the data comprises prediction based on normal subsequent data choice.

15. The method of claim 10, wherein the data is selected based upon chance of link from requested data being followed.

16. The method of claim 15, wherein a sponsor policy is employed.

17. An apparatus, comprising:
    a memory having program code stored therein; and
    a processor disposed in communication with the memory for carrying out instructions in accordance with the stored program code;
    wherein the program code, when executed by the processor, causes the processor to perform:
    monitoring an interaction network;
    obtaining one or more measurement values corresponding to the monitoring of the interaction network;
    selecting data, wherein selection is based upon one or more of the measurement values corresponding to the monitoring of the interaction network; and
    sending the selected data over a multicast network,
    wherein the data is selected based upon number of requests for the data that originate from a broadcast cell.

18. The apparatus of claim 17, wherein the multicast network is unidirectional.

19. The apparatus of claim 17, wherein the interaction network is bidirectional.

20. The apparatus of claim 17, wherein, in monitoring the interaction network, a predetermined number of requests for a page are recognized, and wherein selecting the data comprises selecting a promotional file.

21. The apparatus of claim 17, wherein selecting the data comprises prediction based on normal subsequent data choice.

22. The apparatus of claim 17, wherein the data is selected based upon chance of link from requested data being followed.

23. The apparatus of claim 22, wherein a sponsor policy is employed.

24. The apparatus of claim 17, wherein the monitoring comprises employment of a network management agent.

25. The apparatus of claim 17, wherein the monitoring comprises employment of a proxy.

26. An apparatus, comprising:
a memory having program code stored therein; and
a processor disposed in communication with the memory for carrying out instructions in accordance with the stored program code;
wherein the program code, when executed by the processor, causes the processor to perform:
providing, via an interaction network, one or more requests; and
receiving, over a multicast network, selected data through a local proxy,
wherein monitoring of the interaction network is performed, wherein one or more measurement values corresponding to the monitoring of the interaction network are obtained,
wherein selection of the data is based upon one or more of the measurement values corresponding to the monitoring of the interaction network, and
wherein the data is selected based upon number of requests for the data that originate from a broadcast cell.

27. The apparatus of claim 26, wherein the multicast network is unidirectional.

28. The apparatus of claim 26, wherein the interaction network is bidirectional.

29. The apparatus of claim 26, wherein, in monitoring the interaction network, a predetermined number of requests for a page are recognized, and wherein selection of the data comprises selecting a promotional file.

30. The apparatus of claim 26, wherein selection of the data comprises prediction based on normal subsequent data choice.

31. The apparatus of claim 26, wherein the data is selected based upon chance of link from requested data being followed.

32. The apparatus of claim 26, further comprising:
a network interface disposed in communication with the processor,
wherein the apparatus is a cellular phone.

33. An article of manufacture comprising a computer readable medium containing program code that when executed causes an apparatus to perform:
monitoring an interaction network;
obtaining one or more measurement values corresponding to the monitoring of the interaction network;
selecting data, wherein selection is based upon one or more of the measurement values corresponding to the monitoring of the interaction network; and
sending the selected data over a multicast network,
wherein the data is selected based upon number of requests for the data that originate from a broadcast cell.

34. An article of manufacture comprising a computer readable medium containing program code that when executed causes an apparatus to perform:
providing, via an interaction network, one or more requests; and
receiving, over a multicast network, selected data through a local proxy,
wherein monitoring of the interaction network is performed, wherein one or more measurement values corresponding to the monitoring of the interaction network are obtained,
wherein selection of the data is based upon one or more of the measurement values corresponding to the monitoring of the interaction network, and
wherein the data is selected based upon number of requests for the data that originate from a broadcast cell.

* * * * *